US009501338B2

(12) United States Patent
Liang (10) Patent No.: US 9,501,338 B2
(45) Date of Patent: Nov. 22, 2016

(54) METHOD AND APPARATUS FOR MANAGING PROCESSES

(71) Applicant: TENCENT TECHNOLOGY (SHENZHEN) COMPANY LIMITED, Guangdong (CN)

(72) Inventor: Jiahui Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/809,066

(22) Filed: Jul. 24, 2015

(65) Prior Publication Data

US 2015/0331725 A1 Nov. 19, 2015

Related U.S. Application Data

(63) Continuation of application No. PCT/CN2014/073578, filed on Mar. 18, 2014.

(30) Foreign Application Priority Data

Mar. 22, 2013 (CN) .......................... 2013 1 0096287

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 9/48 | (2006.01) |

(52) U.S. Cl.
CPC .............. G06F 9/542 (2013.01); G06F 9/442 (2013.01); G06F 9/466 (2013.01); G06F 9/485 (2013.01)

(58) Field of Classification Search
None
See application file for complete search history.

(56) References Cited

U.S. PATENT DOCUMENTS

| | | | | |
|---|---|---|---|---|
| 6,438,684 | B1* | 8/2002 | Mitchell | G06F 1/24 713/1 |
| 6,907,605 | B1* | 6/2005 | Ault | G06F 9/485 718/100 |
| 8,595,349 | B1* | 11/2013 | Wong | G06F 11/3096 709/224 |
| 2003/0023408 | A1* | 1/2003 | Wight | G05B 19/408 702/187 |
| 2006/0253592 | A1* | 11/2006 | Oashi | G06F 9/542 709/227 |
| 2008/0189708 | A1* | 8/2008 | Cheng | G06F 9/542 718/102 |
| 2009/0276860 | A1* | 11/2009 | Miyabashi | G06F 21/6245 726/30 |
| 2010/0315564 | A1* | 12/2010 | Hung | G06F 9/485 348/739 |
| 2012/0324481 | A1* | 12/2012 | Xia | G06F 9/485 719/320 |
| 2013/0047039 | A1* | 2/2013 | Manes | G06F 11/3409 714/47.1 |
| 2014/0165190 | A1* | 6/2014 | Quigley | G06F 21/556 726/22 |

* cited by examiner

Primary Examiner — Umut Onat
Assistant Examiner — William C Wood
(74) Attorney, Agent, or Firm — Anova Law Group, PLLC (57) ABSTRACT

A method and apparatus for managing processes are provided, the method comprising: obtaining a process identifier for a process in an operating system; after the shutdown of the process by a user, determining, in response to a first system event of the operating system, whether a first set of event objects comprise the process identifier to generate an examination result; and if the examination result indicates that the first set of event objects comprise the process identifier, deleting the process identifier from the first set of event objects. The method and apparatus for managing processes effectively prevent a process that was shut down by a user from being unintentionally reinitiated.

25 Claims, 7 Drawing Sheets

METHOD AND APPARATUS FOR MANAGING PROCESSES

CROSS-REFERENCE TO RELATED APPLICATIONS

This application is a continuation of International Patent Application No. PCT/CN2014/073578, entitled "Method and Apparatus for Managing Processes," filed on Mar. 18, 2014. This application claims the benefit and priority of Chinese Patent Application No. 201310096287.8, entitled "Method and Apparatus for Managing Processes," filed on Mar. 22, 2013. The entire disclosures of each of the above applications are incorporated herein by reference.

TECHNICAL FIELD

The present invention relates to computer technologies, and more particularly, to a method and apparatus for managing processes in a computer system.

BACKGROUND

In the Android operating system, there are three ways to shut down a process: (1) a user of normal priority can call the Android API killBackgroundProcesses( ) to shut down a process; (2) the root can call the kill(pid) command to shut down a process; and (3) the root can call the forceStopPackage( ) function to shut down a process.

While the first method can free up some memory space, the operating system can immediately reinitiate the process, so the first method is not necessarily effective.

In the second method, the kill(pid) command is a Linux command that bypasses the Android operation system, so unpredictable errors could occur, and the process can still be re-initiated by some system events.

The third method also cannot prevent the process from being re-initiated by some system events.

Therefore, there is a need to provide a technical solution that addresses the issue in the conventional technologies where a process that was shut down by a user cannot be prevented from being unintentional reinitiated.

SUMMARY OF THE INVENTION

A method and apparatus for managing processes are provided, which effectively prevent a process that was shut down by a user from being unintentionally reinitiated.

In accordance with embodiments of the present invention, a method for managing processes in a computer system is provided, comprising: obtaining a process identifier for a process in an operating system; after the shutdown of the process by a user, determining, in response to a first system event of the operating system, whether a first set of event objects comprise the process identifier to generate an examination result; and if the examination result indicates that the first set of event objects comprise the process identifier, deleting the process identifier from the first set of event objects.

In accordance with embodiments of the present invention, an apparatus for managing processes in a computer system is provided, comprising: a process identifier acquisition module for obtaining a process identifier for a process in an operating system; an examination module for, after the shutdown of the process by a user, determining, in response to a first system event of the operating system, whether a first set of event objects comprise the process identifier to generate an examination result; and a process identifier processing module for, if the examination result indicates that the first set of event objects comprise the process identifier, deleting the process identifier from the first set of event objects.

In accordance with embodiments of the present invention, the process identifier of a process that was shut down or being shut down by the user is obtained, and deleted from the set of event objects triggered by the system event of the operating system, which effectively prevents the process from being unintentional reinitiated.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

Figure 1:
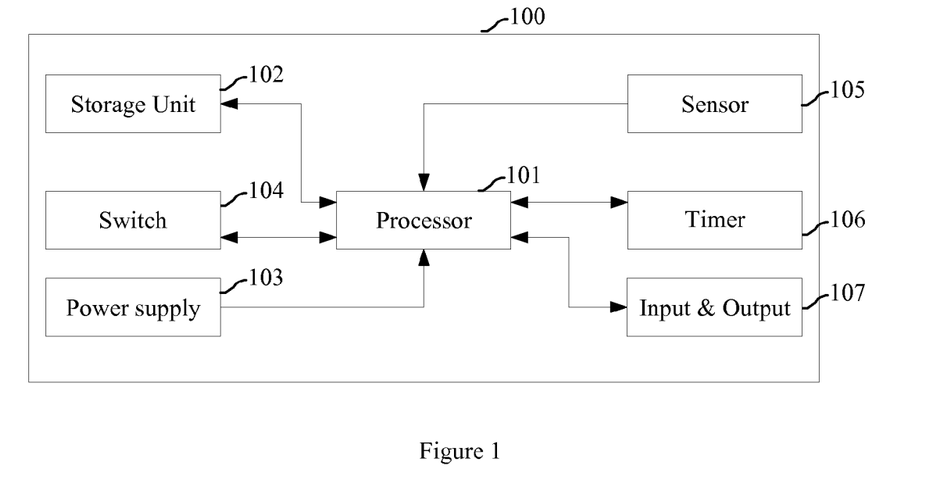
FIG. 1 is an exemplary schematic diagram for the operating environment of an apparatus for managing processes in accordance with an embodiment of the present invention.

FIG. 1 is an exemplary schematic diagram for the operating environment of an apparatus for managing processes in accordance with an embodiment of the present invention. As shown in FIG. 1, the apparatus for managing processes in a computer system in accordance with the embodiments of the present invention can be executed in a computer or an electronic device having a mobile operating system. The computer can be a personal computer or a server, and the electronic device 100 can be a smartphone, a laptop computer, or a tablet computer. The electronic device 100 can include one or more processors 101 (only one processor is shown), a storage unit 102, a power supply 103, a switch 104, a sensor 105, a timer 106, an input/out device 107, or any combination thereof. The electronic device 100 can be used to implement the method and apparatus for managing processes in a computer system in accordance with the embodiments of the present invention.

In this embodiment, the software programs corresponding to the apparatus for managing processes are stored in the storage unit 102, and executed by the processor 101 to manage the processes in the operating system.

In addition, the storage unit 102 can be any computer-readable storage medium, including but not limited to, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks.

Figure 2:
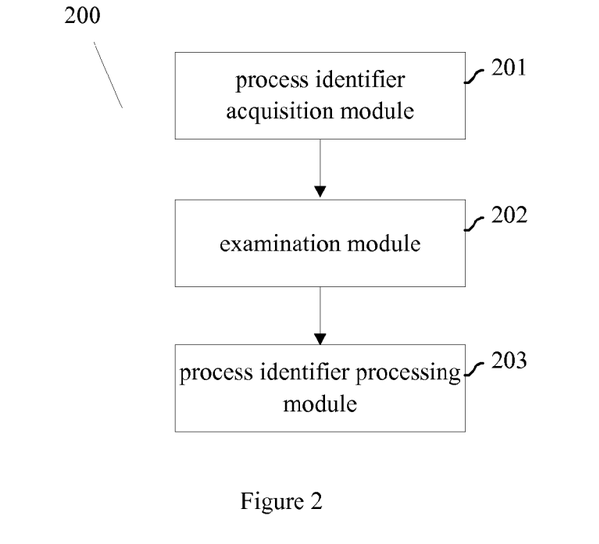
FIG. 2 is an exemplary flowchart for an apparatus for managing processes in accordance with an embodiment of the present invention.

FIG. 2 is an exemplary schematic diagram for an apparatus for managing processes in accordance with an embodiment of the present invention. As shown in FIG. 2, the apparatus 200 is divided into a number of modules based on functionality, and includes a process identifier acquisition module 201, an examination module 202, and a process identifier processing module 203.

The process identifier acquisition module 201 is used for obtaining a process identifier for a process in an operating system.

Here, the process identifier acquisition module 201 can obtain the process identifier from the interface of the operating system, and the process identifier can be an identification code that uniquely represents the process in the operating system.

The examination module 202 is used for, after the shutdown of the process by a user, determining, in response to a first system event of the operating system, whether a first set of event objects comprise the process identifier to generate an examination result. By examining the first set of event objects that the first system event triggers, the examination module 202 can determine whether the process identifier exists in the first set of event objects.

The process identifier processing module 203 is used for, if the examination result indicates that the first set of event objects comprise the process identifier, deleting the process identifier from the first set of event objects. In the event that the process identifier exists in the first set of event objects, the first system event can trigger the process, which will results in the re-initiation of the process that was shutdown. The deletion of the process identifier from the first set of event objects can prevent the unintentional re-initiation of the process. Here, unintentional re-initiation of the process refers to the re-initiation of a process that was shut down by the user against the user's desire or wish, or inadvertent or mistaken initiation of the process.

In this embodiment, the process identifier acquisition module 201 obtains a process identifier for a process that was shut down or being shut down, and the examination module 202 and the process identifier processing module 203 deletes the process identifier from the set of event objects triggered by the system event of the operating system, which effectively prevents the process from being unintentional reinitiated.

Figure 3:
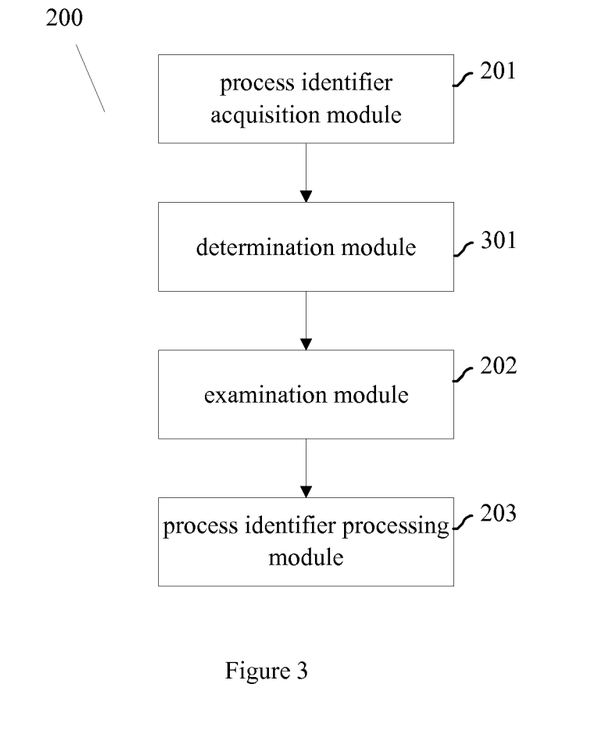
FIG. 3 is an exemplary flowchart for an apparatus for managing processes in accordance with another embodiment of the present invention.

FIG. 3 is an exemplary flowchart for an apparatus for managing processes in accordance with another embodiment of the present invention. This embodiment is similar to the embodiment above, but the apparatus 200 further includes a determination module 301.

The determination module 301 is used for determining whether the first system event can trigger the initiation of the process to generate a determination result. Specifically, the determination module 301 can first analyze the processes that the first system event can trigger, and then compare the process that was shutdown (with a corresponding process identifier) with the processes that the first system event can trigger to determine whether the first system event can trigger the initiation of the process that was shutdown.

The examination module 202 is also used for, if the determination result indicates that the first system event can trigger the initiation of the process, determining whether the first set of event objects comprise the process identifier to generate an examination result.

In this embodiment, the determination module 301 determines whether the first system event can trigger the initiation of the process, and, only if the first system event can trigger the initiation of the process, the examination module 202 examines whether the first set of event objects include the process identifier, which prevents the unnecessary examination of the first set of event objects (where the first system event cannot trigger the initiation of the process), and conserves system resources, such as CPU usage of the processor 101.

Figure 4:
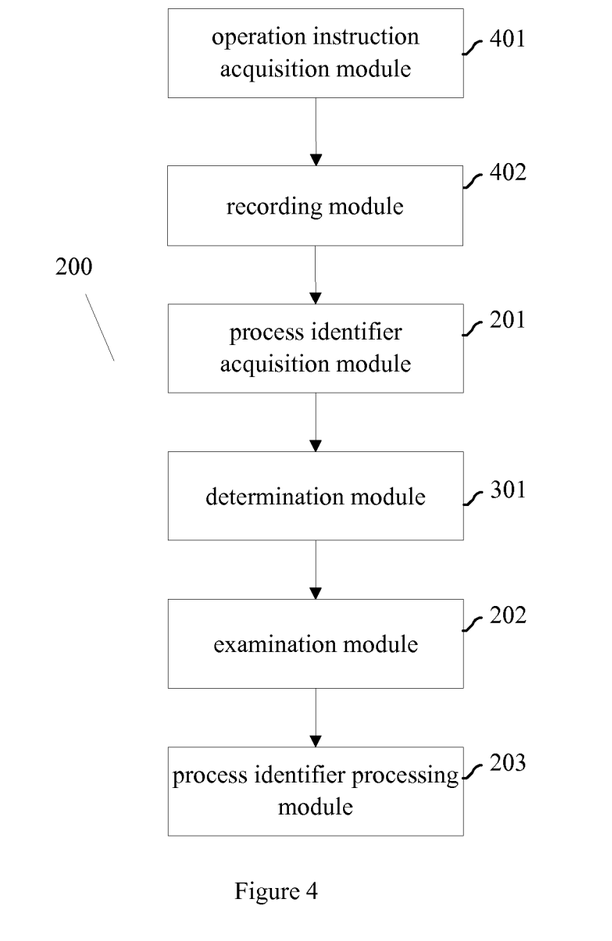
FIG. 4 is an exemplary flowchart for an apparatus for managing processes in accordance with yet another embodiment of the present invention.

FIG. 4 is an exemplary flowchart for an apparatus for managing processes in accordance with yet another embodiment of the present invention. This embodiment is similar to the embodiment above, but the apparatus 200 further includes an operation instruction acquisition module 401 and a recording module 402.

The operation instruction acquisition module 401 is used for, in response to the shutdown of the process by the user, obtaining a first operation instruction related to the shutdown of the process.

The recording module 402 is used for recording a state of the process in accordance with the first operation instruction.

Here, the user operation to shut down the process can trigger the process identifier acquisition module 201 to obtain the process identifier. In addition, the process identifier acquisition module 201 can obtain the process identifier before, after, or during the shutdown of the process In this embodiment, the recording module 402 records the state of the process in response to user operation, and the process is prevented from being unintentionally re-initiated only if the process is shut down by a user operation. In another words, whether the process is shut down by a user operation is determined; if the process is shut down by a user operation, then the process is prevented from being re-initiated by other software or process before the process is re-initiated by the user; and if the process is shut down by other software or process and the user does not desire to shut down the process, then the process is not prevented from being re-initiated by other software or process. The process is prevented from being unintentionally re-initiated only if the process is shut down by a user operation and the user desires to shut down the process. The process is allowed or not prevented from being unintentionally re-initiated if the process is shut down by other software or process and the user does not desire to shut down the process.

In another embodiment, the operation instruction acquisition module 401 is further used for, in response to the initiation of the process by the user, obtaining a second operation instruction related to the initiation of the process.

The recording module 402 is further used for recording a state of the process in accordance with the second operation instruction.

In this embodiment, the recording module 402 records the state of the process in response to user operation, determines whether the process is initiated by the user, or whether the user desires to initiate the process, and if so, allows the process from being triggered by other system events.

In another embodiment, the process identifier processing module 203 is further used for, in response to a second system event of the operating system, adding the process identifier to a second set of event objects. The second system event can be the same as the first system event, and the second set of event objects can be the same as the first set of event objects.

In this embodiment, the process identifier processing module 203 adds the process identifier to the second set of event objects in responses to the second system event, which allows the process from being triggered by other system events.

In another embodiment, the process identifier processing module 203 includes a system overtaking module for taking over the process management of the operating system.

In another embodiment, the operating system is the Android operating system.

In another embodiment, the process identifier processing module 203 includes a system event monitoring module for monitoring system event of the operating system.

In another embodiment, the process identifier processing module 203 includes a process management module for shutting down and initiating processes.

Figure 5:
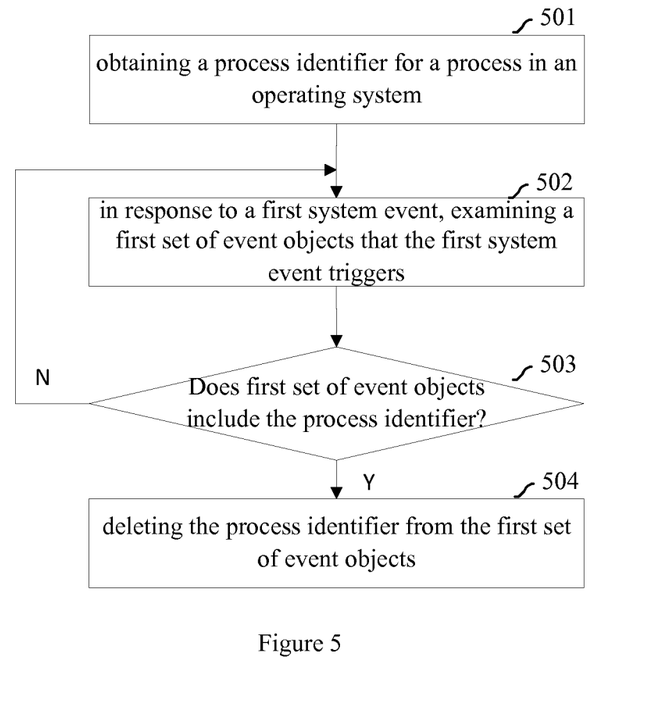
FIG. 5 is an exemplary flowchart for a method for managing processes in accordance with an embodiment of the present invention.

FIG. 5 is an exemplary flowchart for a method for managing processes in accordance with an embodiment of the present invention. As shown in FIG. 5, the method for managing processes includes the following steps.

Step 501: obtaining a process identifier for a process in an operating system.

Here, the process identifier acquisition module 201 can obtain the process identifier from the interface of the operating system, and the process identifier can be an identification code that uniquely represents the process in the operating system.

Steps 502 and 503: after the shutdown of the process by a user, in response to a first system event of the operating system, examining a first set of event objects, and determining whether a first set of event objects comprise the process identifier to generate an examination result.

In Steps 502 and 503, by examining the first set of event objects that the first system event triggers, the examination module 202 can determine whether the process identifier exists in the first set of event objects.

If the examination result indicates that the first set of event objects comprise the process identifier, Step 504 is performed next. If the examination result indicates that the first set of event objects do not include the process identifier, Step 502 is performed next.

Step 504: deleting the process identifier from the first set of event objects.

In the event that the process identifier exists in the first set of event objects, the first system event can trigger the process, which will results in the re-initiation of the process that was shutdown. The deletion of the process identifier from the first set of event objects can prevent the unintentional re-initiation of the process. Here, unintentional re-initiation of the process refers to the re-initiation of a process that was shut down by the user against the user's desire or wish, or inadvertent or mistaken initiation of the process.

In this embodiment, the process identifier acquisition module 201 obtains a process identifier for a process that was shut down or being shut down, and the examination module 202 and the process identifier processing module 203 deletes the process identifier from the set of event objects triggered by the system event of the operating system, which effectively prevents the process from being unintentional reinitiated.

Figure 6:
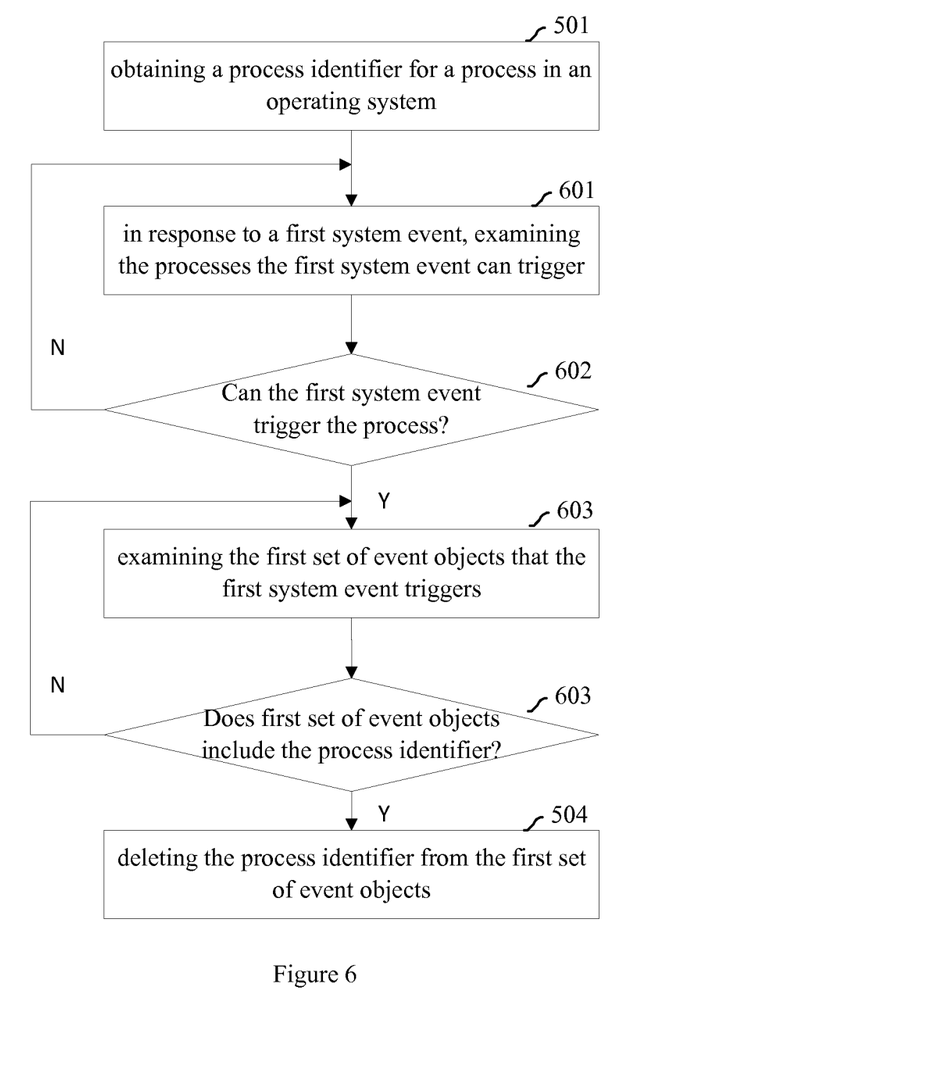
FIG. 6 is an exemplary flowchart for a method for managing processes in accordance with another embodiment of the present invention.

FIG. 6 is an exemplary flowchart for a method for managing processes in accordance with another embodiment of the present invention. As shown in FIG. 6, this embodiment is similar to the embodiment above, but the step of determining, in response to a first system event of the operating system, whether a first set of event objects comprise the process identifier to generate an examination result (Steps 502 and 503) further includes the following steps.

Steps 601 and 602: determining whether the first system event can trigger the initiation of the process to generate a determination result.

Specifically, the determination module 301 can first analyze the processes that the first system event can trigger, and then compare the process that was shutdown (with a corresponding process identifier) with the processes that the first system event can trigger to determine whether the first system event can trigger the initiation of the process that was shutdown.

If the determination result indicates that the first system event can trigger the initiation of the process, Step 603 is performed next; otherwise, Step 601 is performed next.

Steps 603 and 604: if the determination result indicates that the first system event can trigger the initiation of the process, determining whether the first set of event objects comprise the process identifier to generate an examination result.

In this embodiment, the determination module 301 determines whether the first system event can trigger the initiation of the process, and, only if the first system event can trigger the initiation of the process, the examination module 202 examines whether the first set of event objects include the process identifier, which prevents the unnecessary examination of the first set of event objects (where the first system event cannot trigger the initiation of the process), and conserves system resources, such as CPU usage of the processor 101.

Figure 7:
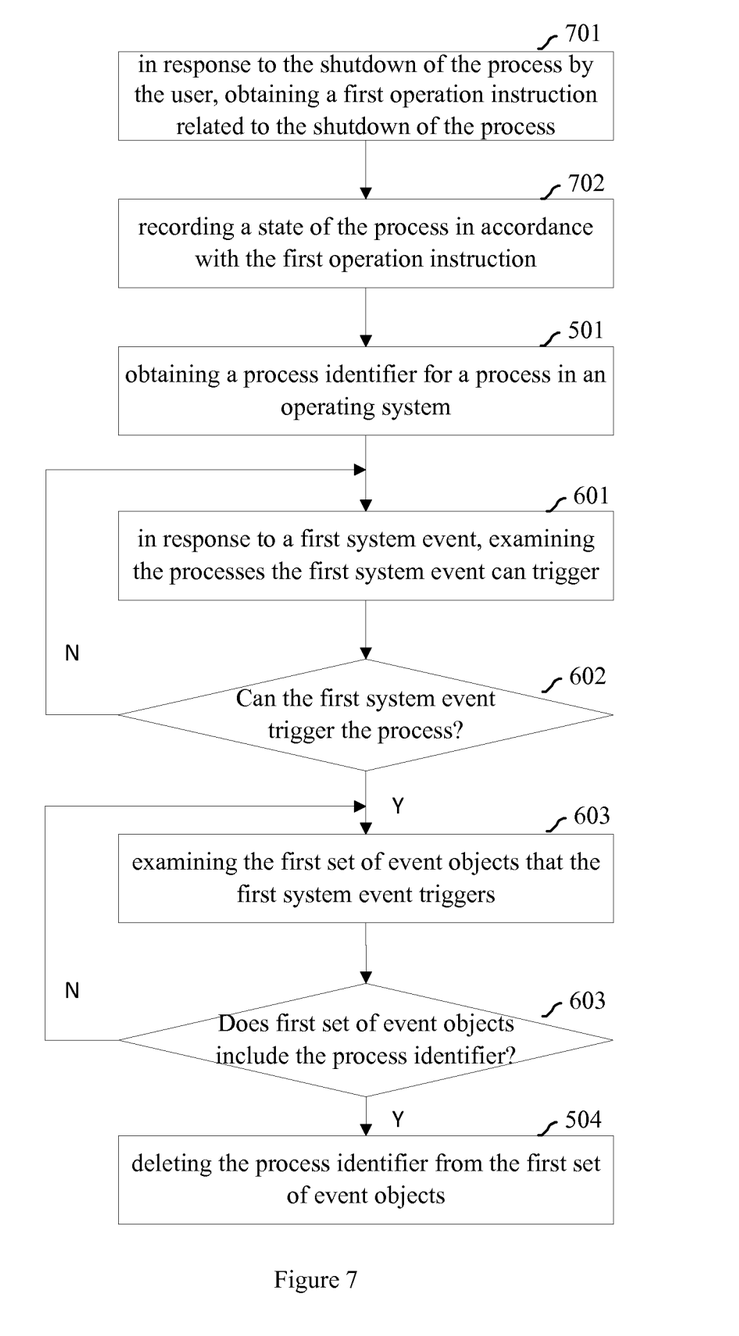
FIG. 7 is an exemplary flowchart for a method for managing processes in accordance with yet another embodiment of the present invention.

FIG. 7 is an exemplary flowchart for a method for managing processes in accordance with yet another embodiment of the present invention. As shown in FIG. 7, this embodiment is similar to the embodiments above, but prior to the step of determining, in response to a first system event of the operating system, whether a first set of event objects comprise the process identifier to generate an examination result (Steps 502 and 503), the method further includes the following steps.

Step 701: in response to the shutdown of the process by the user, obtaining a first operation instruction related to the shutdown of the process.

Step 702: recording a state of the process in accordance with the first operation instruction.

Here, with respect to Step 501, the user operation to shut down the process can trigger the process identifier acquisition module 201 to obtain the process identifier. In addition, the process identifier acquisition module 201 can obtain the process identifier before, after, or during the shutdown of the process In this embodiment, the recording module 402 records the state of the process in response to user operation, and the process is prevented from being unintentionally re-initiated only if the process is shut down by a user operation. In other words, whether the process is shut down by a user operation is determined; if the process is shut down by a user operation, then the process is prevented from being re-initiated by other software or process before the process is re-initiated by the user; and if the process is shut down by other software or process and the user does not desire to shut down the process, then the process is not prevented from being re-initiated by other software or process. The process is prevented from being unintentionally re-initiated only if the process is shut down by a user operation and the user desires to shut down the process. The process is allowed or not prevented from being unintentionally re-initiated if the process is shut down by other software or process and the user does not desire to shut down the process.

Figure 8:
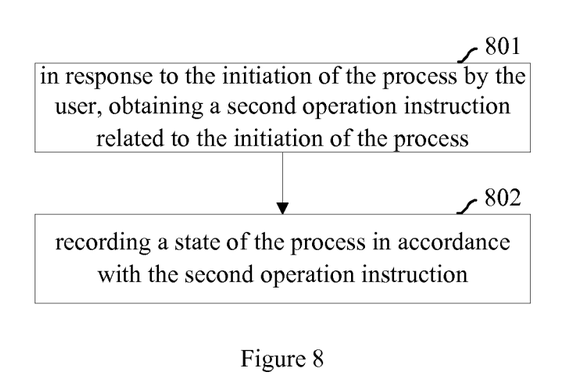
FIG. 8 is an exemplary flowchart for a method for managing processes in accordance with yet another embodiment of the present invention.

FIG. 8 is an exemplary flowchart for a method for managing processes in accordance with yet another embodiment of the present invention. As shown in FIG. 8, this embodiment is similar to the embodiments above, but after the step of deleting the process identifier from the first set of event objects (Steps 504), the method further includes the following steps.

Step 801: in response to the initiation of the process by the user, obtaining a second operation instruction related to the initiation of the process.

Step 802: recording a state of the process in accordance with the second operation instruction.

In this embodiment, the recording module 402 records the state of the process in response to user operation, determines whether the process is initiated by the user, or whether the user desires to initiate the process, and if so, allows the process from being triggered by other system events.

Figure 9:
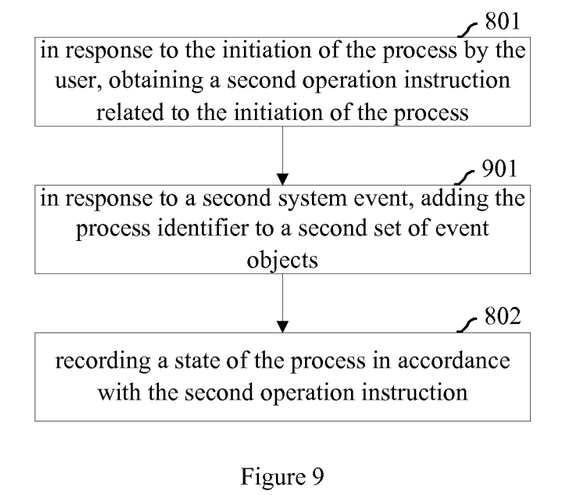
FIG. 9 is an exemplary flowchart for a method for managing processes in accordance with yet another embodiment of the present invention.

FIG. 9 is an exemplary flowchart for a method for managing processes in accordance with yet another embodiment of the present invention. As shown in FIG. 9, this embodiment is similar to the embodiments above, but after the step of in response to the initiation of the process by the user, obtaining a second operation instruction related to the initiation of the process (Steps 801), the method further includes the following steps.

Step 901: in response to a second system event of the operating system, adding the process identifier to a second set of event objects. The second system event can be the same as the first system event, and the second set of event objects can be the same as the first set of event objects.

In this embodiment, the process identifier processing module 203 adds the process identifier to the second set of event objects in responses to the second system event, which allows the process from being triggered by other system events.

In another embodiment, the method further includes taking over the process management of the operating system.

In another embodiment, the operating system is the Android operating system.

In another embodiment, the method further includes monitoring system event of the operating system.

The various components described in the embodiments of the present invention, such as the process identifier acquisition module 201, the examination module 202, the process identifier processing module 203, the determination module 301, the operation instruction acquisition module 401, and the recording module 402, can be implemented by a computer processor executing software or firmware in memory. It should be noted that, in the above descriptions, the various modules in the apparatus are merely exemplary examples used to illustrate the embodiments of the present invention by way of examples. In practice, the various functions can be allocated to different modules based on need, and the apparatus can be divided into different modules to perform the whole or part of the functions described above. In addition, the operational principles of the apparatus embodiments are the same as or similar to those of the method embodiments, and the description of the method embodiments above can be referenced for the implementation details of the apparatus embodiments.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for managing processes in a computer system, comprising:
   obtaining a process identifier for a process in an operating system;
   in response to a shutdown of the process by a user, determining whether a first set of event objects in response to a first system event of the operating system comprise the process identifier to generate an examination result, the first system event of the operating system being occurred after the shutdown of the process by the user is completed;
   determining whether the first system event is triggered in response to an operation instruction from the user to initiate the process, and generating a determination result; and
   if the determination result indicates that the process is not triggered by the operation instruction from the user, and if the examination result indicates that the first set of event objects comprise the process identifier, based on the determination result and the examination result, deleting the process identifier from the first set of event objects wherein the process will no longer be initiated in response to the first system event.

2. The method of claim 1, wherein the step of determining whether a first set of event objects in response to a first system event of the operating system comprise the process identifier to generate an examination result comprises:
   determining whether the first system event can trigger the initiation of the process to generate a determination result; and
   if the determination result indicates that the first system event can trigger the initiation of the process, determining whether the first set of event objects comprise the process identifier to generate an examination result.

3. The method of claim 1, further comprising, prior to the step of determining whether a first set of event objects in response to a first system event of the operating system comprise the process identifier to generate an examination result,
    in response to the shutdown of the process by the user, obtaining a first operation instruction related to the shutdown of the process; and
    recording a state of the process in accordance with the first operation instruction.

4. The method of claim 1, further comprising, after the step of deleting the process identifier from the first set of event objects,
    in response to the initiation of the process by the user, obtaining a second operation instruction related to the initiation of the process; and
    recording a state of the process in accordance with the second operation instruction.

5. The method of claim 1, further comprising taking over the process management of the operating system.

6. The method of claim 1, wherein the operating system is an Android operating system.

7. The method of claim 1, further comprising monitoring system events in the operating system.

8. The method of claim 1, further comprising:
    recording a state of the process in response to a user operation, the state of the process indicating a most recent operation instruction from the user and including: a user-operated shutdown, and a user-operated initiation;
    when the state of the process is the user-operated shutdown, and when the examination result indicates that the first set of event objects comprise the process identifier, deleting the process identifier from the first set of event objects wherein the process will no longer be initiated in response to the first system event; and
    when the state of the process is the user-operated initiation, and when a second system event of the operating system occurs, adding the process identifier to a second set of event objects in response to the second system event.

9. An apparatus for managing processes in a computer system, comprising at least one processor, a memory, and a plurality of program modules stored in the memory and to be executed by the at least one processor, the plurality of program modules comprising:
    a process identifier acquisition module for obtaining a process identifier for a process in an operating system;
    an examination module for, in response to a shutdown of the process by a user, determining whether a first set of event object in response to a first system event of the operating system comprise the process identifier to generate an examination result, the first system event of the operating system being occurred after the shutdown of the process by the user is completed; and determining whether the first system event is triggered in response to an operation instruction from the user to initiate the process, and generating a determination result; and
    a process identifier processing module for, if the determination result indicates that the process is not triggered by the operation instruction from the user, and if the examination result indicates that the first set of event objects comprise the process identifier, based on the determination result and the examination result, deleting the process identifier from the first set of event objects wherein the process will no longer be initiated in response to the first system event.

10. The apparatus of claim 9, further comprising:
    a determination module for determining whether the first system event can trigger the initiation of the process to generate a determination result; and wherein
    the examination module is configured for, if the determination result indicates that the first system event can trigger the initiation of the process, determining whether the first set of event objects comprise the process identifier to generate an examination result.

11. The apparatus of claim 9, further comprising:
    an operation instruction acquisition module for, in response to the shutdown of the process by the user, obtaining a first operation instruction related to the shutdown of the process; and
    a recording module for recording a state of the process in accordance with the first operation instruction.

12. The apparatus of claim 9, wherein
    the operation instruction acquisition module is further configured for, in response to the initiation of the process by the user, obtaining a second operation instruction related to the initiation of the process; and
    the recording module is further configured for recording a state of the process in accordance with the second operation instruction.

13. The apparatus of claim 12, wherein the process identifier processing module is further configured for, in response to a second system event of the operating system, adding the process identifier to a second set of event objects.

14. The apparatus of claim 9, wherein the process identifier processing module comprises a system overtaking module for taking over the process management of the operating system.

15. The apparatus of claim 9, wherein the operating system is an Android operating system.

16. The apparatus of claim 9, wherein the process identifier processing module comprises a system event monitoring module for monitoring system event of the operating system.

17. The apparatus of claim 9, wherein the process identifier processing module comprises a process management module for shutting down and initiating processes.

18. A non-transitory computer-readable medium having stored thereon computer-executable instructions, said computer-executable instructions comprising a method for managing processes in a computer system, the method comprising:
    obtaining a process identifier for a process in an operating system;
    in response to a shutdown of the process by a user, determining whether a first set of event objects in response to a first system event of the operating system comprise the process identifier to generate an examination result, the first system event of the operating system being occurred after the shutdown of the process by the user is completed;
    determining whether the first system event is triggered in response to an operation instruction from the user to initiate the process, and generating a determination result; and
    if the determination result indicates that the process is not triggered by the operation instruction from the user, and if the examination result indicates that the first set of event objects comprise the process identifier, based on the determination result and the examination result, deleting the process identifier from the first set of event objects wherein the process will no longer be initiated in response to the first system event.

19. The non-transitory computer-readable medium of claim 18, wherein the step of determining whether a first set of event objects in response to a first system event of the operating system comprise the process identifier to generate an examination result comprises:
   determining whether the first system event can trigger the initiation of the process to generate a determination result; and
   if the determination result indicates that the first system event can trigger the initiation of the process, determining whether the first set of event objects comprise the process identifier to generate an examination result.

20. The non-transitory computer-readable medium of claim 18, further comprising, prior to the step of determining whether a first set of event objects in response to a first system event of the operating system comprise the process identifier to generate an examination result,
   in response to the shutdown of the process by the user, obtaining a first operation instruction related to the shutdown of the process; and
   recording a state of the process in accordance with the first operation instruction.

21. The non-transitory computer-readable medium of claim 18, further comprising, after the step of deleting the process identifier from the first set of event objects,
   in response to the initiation of the process by the user, obtaining a second operation instruction related to the initiation of the process; and
   recording a state of the process in accordance with the second operation instruction.

22. The non-transitory computer-readable medium of claim 21, further comprising, after the step of in response to the initiation of the process by the user, obtaining a second operation instruction related to the initiation of the process:
   in response to a second system event of the operating system, adding the process identifier to a second set of event objects.

23. The non-transitory computer-readable medium of claim 18, further comprising taking over the process management of the operating system.

24. The non-transitory computer-readable medium of claim 18, wherein the operating system is an Android operating system.

25. The non-transitory computer-readable medium of claim 18, further comprising monitoring system events in the operating system.

* * * * *